United States Patent
Günthner et al.

(10) Patent No.: US 9,068,834 B2
(45) Date of Patent: Jun. 30, 2015

(54) DOUBLE-AXIAL, SHOCK-RESISTANT ROTATION RATE SENSOR WITH NESTED, LINEARLY OSCILLATING SEISMIC ELEMENTS

(75) Inventors: Stefan Günthner, Frankfurt (DE); Ramnath Sivaraman, Gurgaon (IN); Bernhard Schmid, Friedberg (DE); Jasmin Lohmann, Eschborn (DE)

(73) Assignee: Continental Teves AG & Co. oHG (DE)

( * ) Notice: Subject to any disclaimer, the term of this patent is extended or adjusted under 35 U.S.C. 154(b) by 447 days.

(21) Appl. No.: 13/391,314

(22) PCT Filed: Sep. 9, 2010

(86) PCT No.: PCT/EP2010/063250
§ 371 (c)(1),
(2), (4) Date: May 4, 2012

(87) PCT Pub. No.: WO2011/029879
PCT Pub. Date: Mar. 17, 2011

(65) Prior Publication Data
US 2012/0279301 A1 Nov. 8, 2012

(30) Foreign Application Priority Data

Sep. 9, 2009 (DE) .......................... 10 2009 029 310
Sep. 9, 2009 (DE) .......................... 10 2009 029 311

(51) Int. Cl.
*G01P 9/00* (2012.01)
*G01C 19/574* (2012.01)
(52) U.S. Cl.
CPC ..................................... *G01C 19/574* (2013.01)
(58) Field of Classification Search
CPC ........................... G01P 15/125; G01C 19/5719
USPC ...................................................... 73/504.12
See application file for complete search history.

(56) References Cited

U.S. PATENT DOCUMENTS 5,604,312 A * 2/1997 Lutz ........................... 73/504.14
6,122,962 A * 9/2000 Yoshino et al. ............ 73/504.14
(Continued)

FOREIGN PATENT DOCUMENTS

CN 101443629 5/2009
DE 44 28 405 A1 2/1996
(Continued)

OTHER PUBLICATIONS

International Search Report for PCT International Application No. PCT/EP2010/063250 mailed Dec. 6, 2010.
(Continued)

*Primary Examiner* — Hezron E Williams
*Assistant Examiner* — Mark A Shabman
(74) *Attorney, Agent, or Firm* — RatnerPrestia

(57) ABSTRACT

A micromechanical rotation rate sensor, including a substrate whose base surface is aligned parallel to the x-y plane of a Cartesian coordinate system, with the rotation rate sensor having at least one first seismic mass and a second seismic mass which are coupled to at least one first drive device and are suspended such that the first and the second seismic masses are driven such that they are deflected in antiphase in one drive mode, with the rotation rate sensor being designed such that it can detect rotation rates about at least two mutually essentially orthogonal sensitive axes, wherein at least the second seismic mass is in the form of a frame which at least partially surrounds the first seismic mass with respect to the position on the x-y plane.

15 Claims, 18 Drawing Sheets

(56) References Cited

U.S. PATENT DOCUMENTS

| | | | |
|---|---|---|---|
| 6,349,597 B1* | 2/2002 | Folkmer et al. | 73/504.02 |
| 6,691,571 B2* | 2/2004 | Willig et al. | 73/504.12 |
| 6,742,390 B2 | 6/2004 | Mochida | |
| 6,837,107 B2 | 1/2005 | Geen | |
| 6,892,575 B2 | 5/2005 | Nasiri et al. | |
| 7,134,337 B2* | 11/2006 | Willig et al. | 73/504.12 |
| 7,284,429 B2 | 10/2007 | Chaumet | |
| 7,421,897 B2 | 9/2008 | Geen | |
| 7,461,552 B2 | 12/2008 | Acar | |
| 7,950,281 B2 | 5/2011 | Hammerschmidt | |
| 8,256,290 B2 | 9/2012 | Mao | |
| 8,261,614 B2 | 9/2012 | Hartmann | |
| 8,322,213 B2 | 12/2012 | Trusov | |
| 8,342,023 B2 | 1/2013 | Geiger | |
| 8,443,668 B2 | 5/2013 | Ohms | |
| 8,459,110 B2 | 6/2013 | Cazzaniga | |
| 8,794,067 B2* | 8/2014 | Schmid et al. | 73/504.12 |
| 2003/0131664 A1 | 7/2003 | Mochida | |
| 2004/0154398 A1 | 8/2004 | Willig et al. | |
| 2005/0066728 A1* | 3/2005 | Chojnacki et al. | 73/514.16 |
| 2006/0107738 A1 | 5/2006 | Willig | |
| 2006/0112764 A1 | 6/2006 | Higuchi | |
| 2010/0037690 A1 | 2/2010 | Günthner | |
| 2010/0116050 A1* | 5/2010 | Wolfram | 73/504.12 |
| 2012/0279301 A1 | 11/2012 | Gunthner | |

FOREIGN PATENT DOCUMENTS

| | | |
|---|---|---|
| DE | 10300682 | 7/2003 |
| DE | 10 2005 051 048 A1 | 6/2006 |
| DE | 102007012163 A1 | 10/2007 |
| DE | 10 2006 052 522 A1 | 5/2008 |
| DE | 10 2007 030 119 A1 | 1/2009 |
| DE | 102007054505 A1 | 5/2009 |
| EP | 1 832 841 A1 | 9/2007 |
| EP | 1 918 723 A2 | 5/2008 |
| JP | 2007108044 | 4/2007 |
| WO | WO 98/17973 | 4/1998 |
| WO | WO 2004/097432 A2 | 11/2004 |
| WO | 2006070059 | 7/2006 |
| WO | 2006113162 | 10/2006 |
| WO | 2007104742 | 9/2007 |
| WO | WO 2008/015044 A1 | 2/2008 |
| WO | WO 2008/021534 A1 | 2/2008 |
| WO | WO 2008/051677 A2 | 5/2008 |

OTHER PUBLICATIONS

German Application Serial No. 102010040516.7, German Search Report dated Jun. 3, 2011, 5 pgs.

German Search Report corresponding to German Application No. 10 2010 040 514.0 dated Jun. 3, 2011.

International Search Report corresponding to International Application No. PCT/EP2010/063248, dated Nov. 26, 2010.

Entire patent prosecution history of U.S. Appl. No. 13/390,776, filed May 2, 2012, entitled, "Double-Axle, Shock-Resistant Rotation Rate Sensor with Linear and Rotary Seismic Elements."

Chinese Office Action for Chinese Application No. 2010800396831 mailed Oct. 29, 2014.

* cited by examiner

DOUBLE-AXIAL, SHOCK-RESISTANT ROTATION RATE SENSOR WITH NESTED, LINEARLY OSCILLATING SEISMIC ELEMENTS

CROSS-REFERENCE TO RELATED APPLICATIONS

This application is the U.S. National Phase Application of PCT/EP2010/063250, filed Sep. 9, 2010, which claims priority to German Patent Application No. 10 2009 029 311.6, filed Sep. 9, 2009 and German Patent Application No. 10 2009 029 310.8, filed Sep. 9, 2009, the contents of such applications being incorporated by reference herein.

FIELD OF THE INVENTION

The invention relates to a micromechanical rotation rate sensor comprising a substrate whose base surface is aligned parallel to the x-y plane of a Cartesian coordinate system, with the rotation rate sensor having at least one first seismic mass and a second seismic mass which are coupled to at least one first drive device and are suspended such that the first and the second seismic masses are driven such that they are deflected in antiphase in one drive mode, with the rotation rate sensor being designed such that it can detect rotation rates about at least two mutually essentially orthogonal sensitive axes (z, y), and to its use in motor vehicles.

BACKGROUND OF THE INVENTION

Document WO2008015044, which is incorporated by reference, provides a rotation rate sensor which consists of two nested seismic elements which are coupled to one another via springs. Both elements have the same masses. In the drive mode, both masses oscillate in antiphase in the x direction. The read mode is characterized by antiphase oscillation of the seismic masses away from the substrate plane in the z direction, thus allowing rotation rates about the x axis to be detected. Because of the mass equilibrium and because of the fact that their centers of gravity lie on one another, neither mode can be excited directly by linear or rotational disturbances. Nevertheless, those mode forms in which both masses oscillate in the same phase on or away from the plane also exist. These in-phase modes can easily be excited directly by linear vibration, and this adversely affects the operation of the rotation rate sensor. The spring concept leads merely to a mode separation and not to suppression of the in-phase modes. In particular, seismic elements means seismic masses.

The sensor from the document US2004/0154398, which is incorporated by reference, is designed in a similar manner with the read direction lying in the y direction, thus allowing rotation rates about the z axis to be measured. In this case as well, the rotation rate sensor consists of two nested seismic elements, which are coupled to one another via springs. Both elements have the same masses. In the drive mode, both masses oscillate in antiphase in the x direction. The read mode is characterized by antiphase oscillation of the seismic masses in the y direction, thus allowing rotation rates about the z axis to be detected. Because of the mass equilibrium and because of the fact that their centers of gravity lie on one another, neither mode can be excited directly either by linear or by rotational disturbances. Nevertheless, those mode forms in which both masses oscillate in phase in the x and/or y directions also exist. These in-phase modes can easily be excited directly by linear vibration, and this adversely affects the operation of the rotation rate sensor. The spring concept leads merely to a mode separation and not to suppression of the in-phase modes.

Documents WO2004097432, WO2008021534, DE102006052522, DE102005051048, U.S. Pat. No. 6,892,575, EP1832841, WO2008051677, which are incorporated by reference, describe sensors which simultaneously measure rotational movements about the x and y axes—that is to say they cannot measure rotational movements at right angles to the wafer plane. The sensor principles mentioned are single-chip solutions; that is to say the sensor elements for measurement of the orthogonal rotation rates are located on the same monolithic silicon chip. Furthermore, they have the common feature that only a single primary movement is excited for both sensitive axes. This saves control-system complexity; furthermore, the chip area is smaller than in the case of two separate sensors. When a Coriolis force is excited by rotational movement about the x and/or y axes, oscillations are excited with movement components in the z direction. If the intention is to use these sensors to measure rotation rates about the z axis, the sensors must be installed by means of construction and connection technology, that is to say they must be mounted through an angle of 90° with respect to the planar preferred direction—the wafer plane. This leads to additional costs.

Patent specification EP 1918723 B1, which is incorporated by reference, provides a gyroscope which can simultaneously measure rotational movements about the x and z axes. This is once again a single-chip solution with a single primary mode. However, this sensor has the disadvantage that the two read modes—also referred to as the secondary mode (detection of the rotation about the z axis) and tertiary mode (detection of the rotation about the x axis)—can be excited directly by rotational movements, which leads to the sensor being sensitive to disturbances caused by environmental influences.

Document WO9817973A1, which is incorporated by reference, provides a three-axis gyroscope. In this case, in the drive mode, four masses which are each offset through 90° oscillate in the radial direction. This arrangement can distinguish between Coriolis forces in all three spatial directions. However, the individual masses are not directly connected to one another as a result of which linear accelerations at right angles to the substrate plane, for example, lead to the individual masses being deflected away from the substrate plane.

SUMMARY OF THE INVENTION

The purpose of the invention is to propose a micromechanical rotation rate sensor which can detect rotation rates about at least two sensitive axes and which at the same time is designed to be relatively resistant to disturbances.

According to aspects of the invention, this purpose is achieved by the micromechanical rotation rate sensor comprising a substrate whose base surface is aligned parallel to the x-y plane of a Cartesian coordinate system, with the rotation rate sensor having at least one first seismic mass and a second seismic mass which are coupled to at least one first drive device and are suspended such that the first and the second seismic masses are driven such that they are deflected in antiphase in one drive mode, with the rotation rate sensor being designed such that it can detect rotation rates about at least two mutually essentially orthogonal sensitive axes, wherein at least the second seismic mass (2) is in the form of a frame which at least partially surrounds the first seismic mass (1) with respect to the position on the x-y plane.

An aspect of the invention relates to a preferred manner of proposing a micromechanical rotation rate sensor, comprising a substrate whose base surface is aligned parallel to the x-y plane of a Cartesian coordinate system, with the rotation rate sensor having at least one first seismic mass and a second seismic mass which are coupled to at least one first drive device and are suspended such that they are driven such that they are deflected in antiphase in one drive mode, with the rotation rate sensor being designed such that it can detect rotation rates about at least two mutually essentially orthogonal sensitive axes (z, y), wherein at least the second seismic mass is in the form of a frame which at least partially surrounds or clasps the first seismic mass with respect to the position on the x-y plane, in particular with respect to a rest position of the seismic masses.

The frame of the second seismic mass is preferably designed to be closed or alternatively preferably open, that is to say it does not completely clasp the first seismic mass.

The first seismic mass is therefore preferably located, at least with respect to a rest position, in the second seismic mass, which is in the form of a frame.

It is preferable for at least the first and the second seismic masses each to be associated with two read devices.

The term antiphase preferably also means in opposite senses or in the same direction linearly or on a curved path, with a mutually inverse orientation, in particular in pairs with respect to in each case one pair of seismic masses, particularly preferably the first and second seismic masses and in each case one pair of the additional seismic masses.

The phase and the antiphase are each expediently detected separately, in particular by respective separate read devices.

The at least one drive device and/or the at least one read device are preferably in the form of capacitive comb structures or plate structures, with the drive device being excited electrostatically, and with the read device detecting electrostatically.

It is preferable that the first and second seismic masses are coupled to one another by means of at least one first and one second coupling device such that, when a first rotation rate is detected about the first sensitive axis, they oscillate in antiphase in a first read mode, and that, when a second rotation rate is detected about the second sensitive axis, they likewise oscillate in antiphase in a second read mode. In particular, the first and the second coupling devices are designed to be different. It is particularly preferable for the rotation rate sensor to comprise a plurality of first and a plurality of second coupling devices, that is to say a plurality of coupling devices of a first and second type in each case, for symmetry reasons. Very particularly preferably, the rotation rate sensor has four first coupling devices which, for example, couple the antiphase drive mode and the second read mode, as well as two second coupling devices.

It is expedient that the first and second coupling devices each comprise at least one essentially rigid coupling beam, which is coupled by spring elements on the one hand to the first seismic mass and on the other hand to the second seismic mass, and which is suspended in particular on at least one torsion spring element which is designed such that it allows rotational deflections of the coupling beam about one or two axes, and suppresses further rotational deflections and all translational deflections of the coupling beam.

The at least one coupling beam of at least one of the coupling devices, in particular of the first coupling device, in particular of each first coupling device, is or are preferably associated with two or more read devices which are designed and arranged such that they detect the rotational deflection of this coupling beam with respect to the first or the second read mode in phase and in antiphase, in this case one of them in phase and the other in antiphase.

It is preferable that the this coupling beam is designed to be essentially c-shaped, in particular with a base surface essentially parallel to the x-y plane in a rest state, with at least two edge segments and one connection segment, with the connection segment being connected essentially centrally to the torsion spring element such that the two edge segments can be deflected rotationally in antiphase, with this torsion spring element not being completely stiff at least with respect to a parasitic rotational deflection about the y axis, for which reason the two read devices which are associated with this coupling beam are arranged such that the centers of their longitudinal sides, essentially in the direction of the longitudinal side of the two edge segments, are each arranged with respect to the x-y alignment opposite the center of the longitudinal side of one of the edge segments, such that possible in-phase rotational deflections of the two edge segments about the y axis, which result from these two edge segments then being in an inclined position, are essentially not detected by the two read devices, with these two read devices in particular being arranged parallel to the two edge segments in a rest state, in each case with respect to the base surfaces. The bending deflection with a z direction component is in this case a parasitic or undesired deflection, for example caused by an external disturbance.

The coupling devices expediently each comprise two coupling beams.

The first and the second seismic masses preferably have essentially the same mass, with respect to the combination of volume and density.

The rotation rate sensor and the first and the second seismic masses are preferably designed and arranged such that the center of gravity of the entire rotation rate sensor remains essentially at rest with respect to the deflections of the seismic masses in the drive mode.

It is preferable that the rotation rate sensor is designed such that the first sensitive axis lies on the x-y plane, that is to say on the base surface of the substrate, in particular that the first sensitive axis is designed to be parallel to the x axis or to the y axis, and that the second sensitive axis z is designed to be parallel to the z axis, that is to say at right angles to the base surface of the substrate.

It is expedient that the first and second seismic masses of the rotation rate sensor are designed, suspended and coupled by means of at least the first and second coupling devices such that they are suspended such that they can move exclusively for their respective deflections within the drive mode, for their respective deflections within the first read mode and for their respective deflections within the second read mode, and that the first and second seismic masses are suspended stiffly with respect to all other deflections, that is to say all deflections in other directions and all in-phase deflections of the first and second seismic masses are suppressed.

It is preferable that the first coupling device is designed such that it forces antiphase deflections of the seismic masses with respect to the drive mode and suppresses in-phase deflections with respect thereto, and that the first and the second coupling devices are designed such that they force antiphase deflections of the seismic masses with respect to the first and with respect to the second read modes, and suppress in-phase deflections with respect thereto, in particular suppressing all in-phase deflections of the first and second seismic masses.

It is preferable that the deflection of the first and second seismic masses in each of the at least two read modes are detected in a duplicated and differential manner, with the deflection of one of the two seismic masses in each case being detected in opposite senses by two read devices with respect to the antiphase deflection, that is to say to one seismic mass in phase and to the other seismic mass in antiphase, that is to say that the first and second seismic masses and/or the devices which are also deflected with at least one of the seismic masses are each associated with at least two read devices which are each designed and arranged in particular such that one of these two read devices detects a capacitance increase when the other read device detects a capacitance decrease.

Expediently, two or more read devices are connected to one another or are integrated in a common read device system.

The rotation rate sensor is preferably formed monolithically, on a single chip or integrally, thus allowing the two sensitive axes to be aligned considerably more accurately with respect to one another than if split between two chips for sensing rotation rates about different axes, since the alignment of the axes is defined by the micromechanical production, which is several orders of magnitude more precise than conventional construction and connection technology, by means of which two separate sensors can be aligned with respect to one another. Furthermore, the handling of a single-chip sensor element, which can detect rotational movements about two sensitive axes, is also simpler than the handling of two separate sensor elements.

The rotation rate sensor preferably has a single drive device which jointly drives the first and the second seismic masses of the rotation rate sensor in antiphase, for which purpose the seismic masses are suspended, and in particular are coupled to one another by the first coupling device, in an appropriate manner. This results in the control-system complexity being less than that for two separate sensors with two separate drive units since the drive oscillation and drive mode (also referred to as the primary oscillation) must be maintained throughout the entire operating time, which often necessitates a phase-locked loop, as well as closed-loop amplitude control. A single drive device allows significant savings in ASIC area and current draw as well as power consumption, and therefore more cost-effective signal processing. Furthermore, space can be saved by the joint use of a single drive unit, thus allowing more sensors to be located on a silicon wafer, thus allowing the sensors to be produced more cost-effectively.

The at least one drive device, in particular the single drive device, is rigidly connected to the first or to the second seismic mass, particularly preferably to the first seismic mass.

It is preferable that the at least one drive device is coupled to the first or to the second seismic mass by means of at least one spring element, such that translational coupling is provided in the drive direction between the drive unit and the first or second seismic mass, and decoupling is provided in all other at least translational directions.

The drive device is expediently additionally suspended on the substrate by at least one further spring element, for example on an anchor on the substrate. This suspension is designed in this case to be stiff on the x-y plane and in this case at right angles to the drive direction, such that deflections of the drive device on the x-y plane in a direction other than the output-drive direction are suppressed.

If the capability to carry out deflections or oscillations is or becomes restricted, for example by "exclusively" or "only", all other movements are expediently impossible. For example, if only linear deflections in the y direction are possible, all rotational deflection forms are impossible, and no deflections are possible in the x or z directions.

A translational deflection or oscillation preferably means a linear deflection or oscillation, and vice versa.

In particular, seismic elements mean seismic masses, and vice versa.

The invention also relates to a method for production of the micromechanical rotation rate sensor.

The invention also relates to the use of the rotation rate sensor in motor vehicles, in particular for detection of the yaw rate, that is to say rotation about the vertical axis of the vehicle, and for detection of a roll rate or a pitch rate. In addition or alternatively, this arrangement is preferably also used for the simultaneous measurement of yaw rate and roll rate, yaw rate and pitch rate, or roll rate and pitch rate in vehicles. This information is used for detection and monitoring of motion-dynamic situations in ESP, occupant protection and comfort control systems. Sensors which are used in this field have to provide high rotation rate measurement accuracy, and a signal-to-noise ratio which is as low as possible. A further requirement for these sensors is good resistance to external disturbances, such as mechanical vibration and shocks. The sensor proposed here is preferably designed such that it can comply with all these requirements, but in particular vibration robustness.

BRIEF DESCRIPTION OF THE DRAWINGS

The invention is best understood from the following detailed description when read in connection with the accompanying drawing. Included in the drawing is the following figure.

DETAILED DESCRIPTION OF THE PREFERRED EMBODIMENTS

Figure 1:
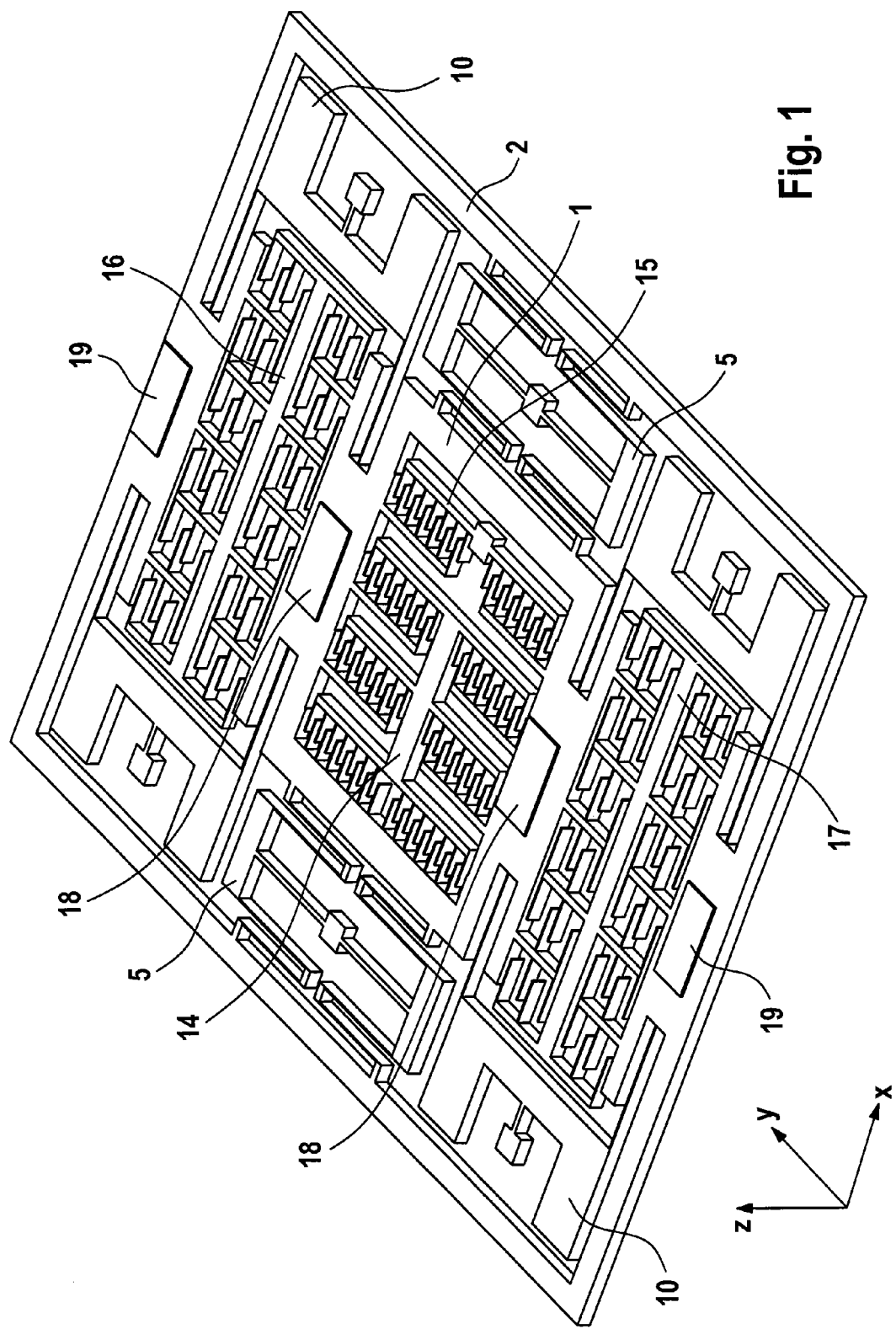
FIG. 1 shows a perspective view of a dual-axial rotation rate sensor,—exemplary embodiment 1.
Figure 2:
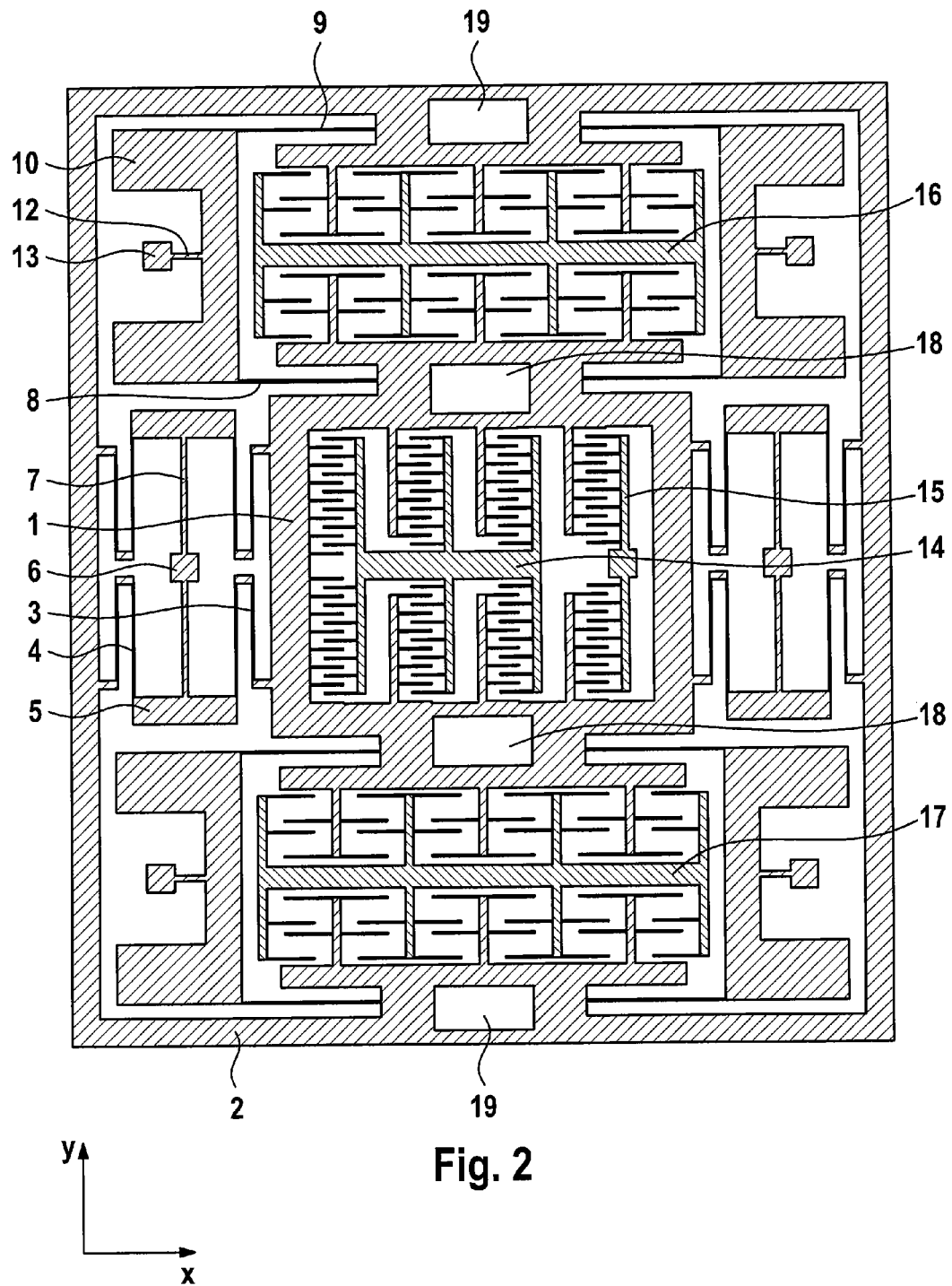
FIG. 2 shows a plan view of exemplary embodiment 1.
Figure 3:
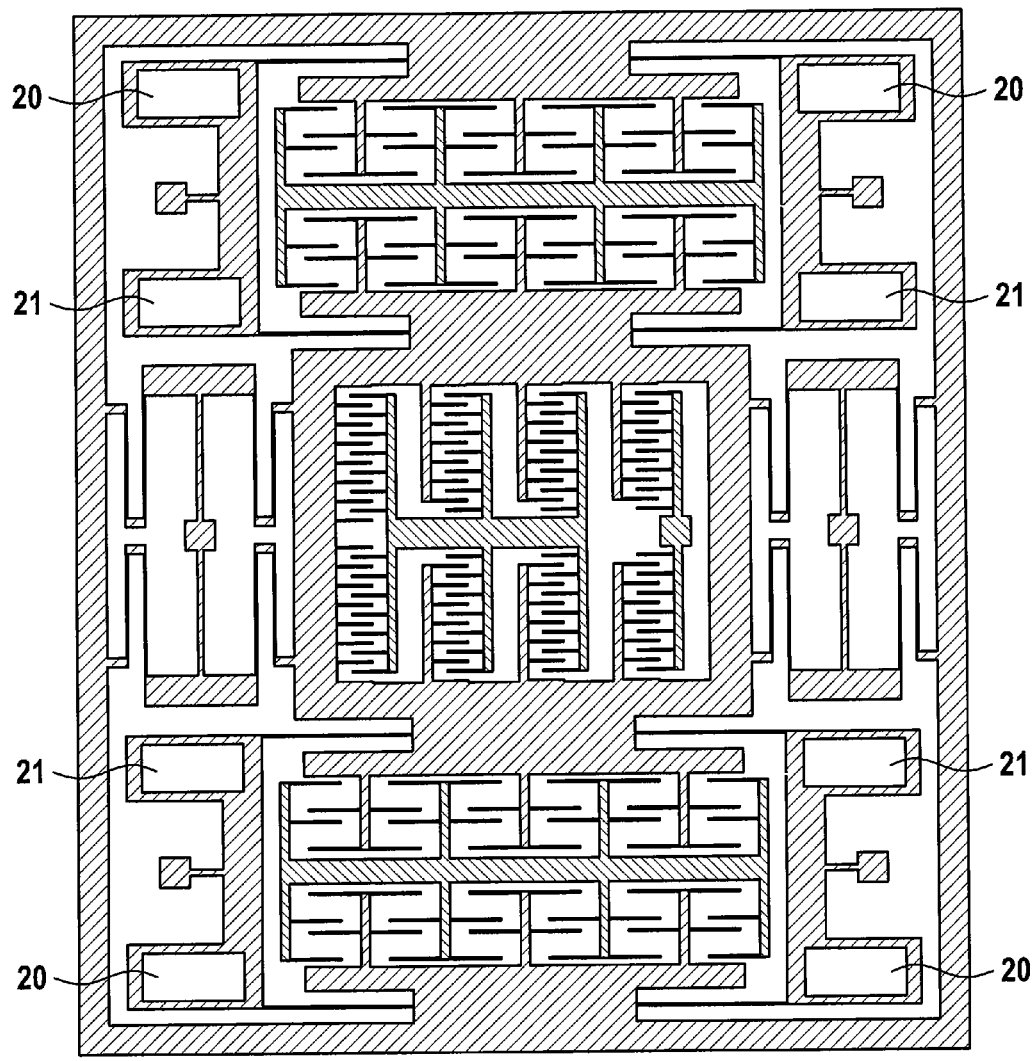
FIG. 3 shows a plan view of exemplary embodiment 1 with alternative detection.
Figure 3:
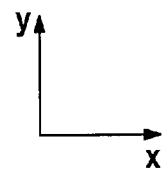

Exemplary Embodiment 1:

FIG. 1 and FIG. 2 show the rotation rate sensor which can detect both rotation speeds and rotation rates about the z axis, as a second sensitive axis, and about the y axis, as a first sensitive axis. The sensor consists of two seismic elements or seismic masses 1 and 2, which are arranged such that their coordinates of their centers of gravity coincide. The masses of the two masses 1 and 2 are, by way of example, the same, and are distributed as symmetrically as possible with respect to the coordinate system planes which are covered by the main inertia axes. However, it may also be advantageous for the masses of the seismic elements to be slightly mistuned, in order to compensate for unavoidable asymmetries, thus achieving a better vibration response. By way of example, one unavoidable asymmetry is the actual different stiffness response of the two ideally infinitely stiff masses.

The two masses are connected to one another and to substrate anchors 6, 13 via spring-and-beam elements or spring elements 3, 4, 5, 7 and 8, 9, 10, 12. The spring-and-beam elements or spring elements 3, 4, 5, 7 make it possible for the two seismic masses 1 and 2 to move freely in the x direction, but restrict the freedom of movement in the y and z directions such that the masses 1, 2 can move only in antiphase with respect to one another along these axes. The spring-and-beam elements 8, 9, 10, 12 allow the two masses 1 and 2 to move freely in the y direction, but restrict the freedom of movement in the x and z directions, such that the masses can move only in antiphase with respect to one another along these axes.

The spring-and-beam elements 3, 4, 5, 7 and 8, 9, 10, 12 respectively each contain a rigid coupling beam 5 or 10, which is connected to respective substrate anchors 6 or 13 via respective torsion spring elements 7 or 12. The respective torsion spring elements 7 or 12 are stiff in the direction of their longitudinal axis, but allow rotations about their longitudinal axis, or about the z axis. Ideally, the respective torsion spring elements 7 and 12 are as stiff as possible for deflections at right angles to their longitudinal axis on the substrate plane and away from the substrate plane. The respective spring elements 7 and 12 act approximately at the center of gravity of the respective coupling beam 5 or 10, with the coupling beams being formed symmetrically with respect to the longitudinal axis of the respective spring elements 7 and 12. This ensures that the respective coupling beams 5 and 10 can primarily carry out rotations about the z axis, or about the longitudinal axis of the spring elements 7 or 12, and the magnitudes of the deflections at the outer ends of the coupling beams assume small values. The outer ends of the coupling beam 5 are connected to the seismic masses 1 and 2 via spring elements 3 and 4. The outer ends of the coupling beam 10 are connected to the masses 1 and 2 via spring elements 8 and 9. The respective spring elements 3 and 4 as well as 8 and 9 are designed to be as symmetrical as possible with respect to the longitudinal axis of the respective spring elements 7 or 12. They allow movements on the plane at right angles to the longitudinal axis of the respective spring elements 7 and 12. They are stiff in the direction of the longitudinal axis of the respective spring element 7 or 12 and are as stiff as possible in the z direction, as a result of which the deflections of the outer ends of the coupling beams correspond to the deflections of the corresponding masses 1 and 2.

Figure 4:
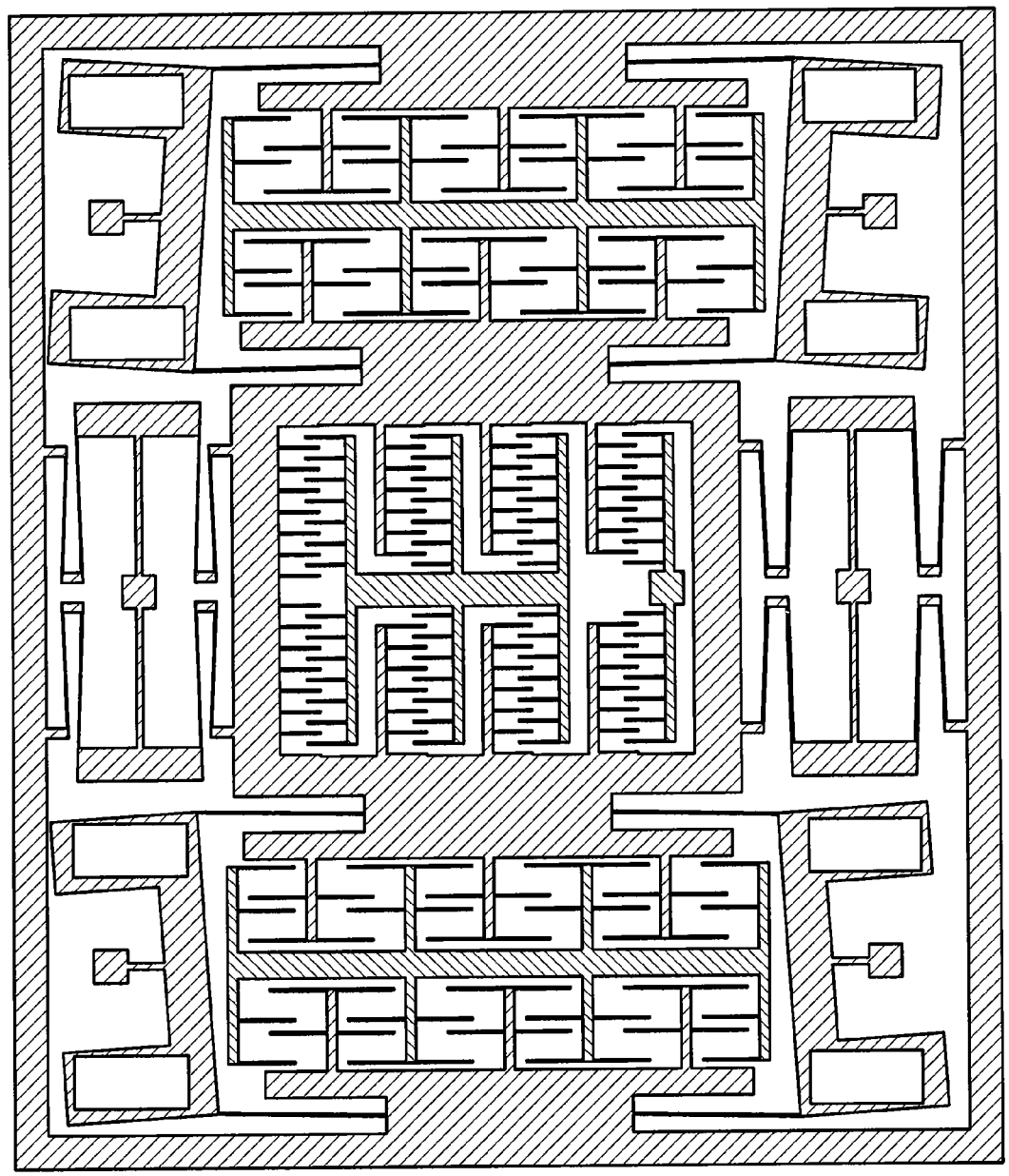
FIG. 4 shows exemplary embodiment 1, primary mode and drive mode with read devices.
Figure 4:
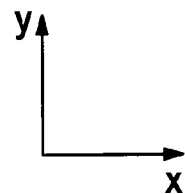
Figure 5:
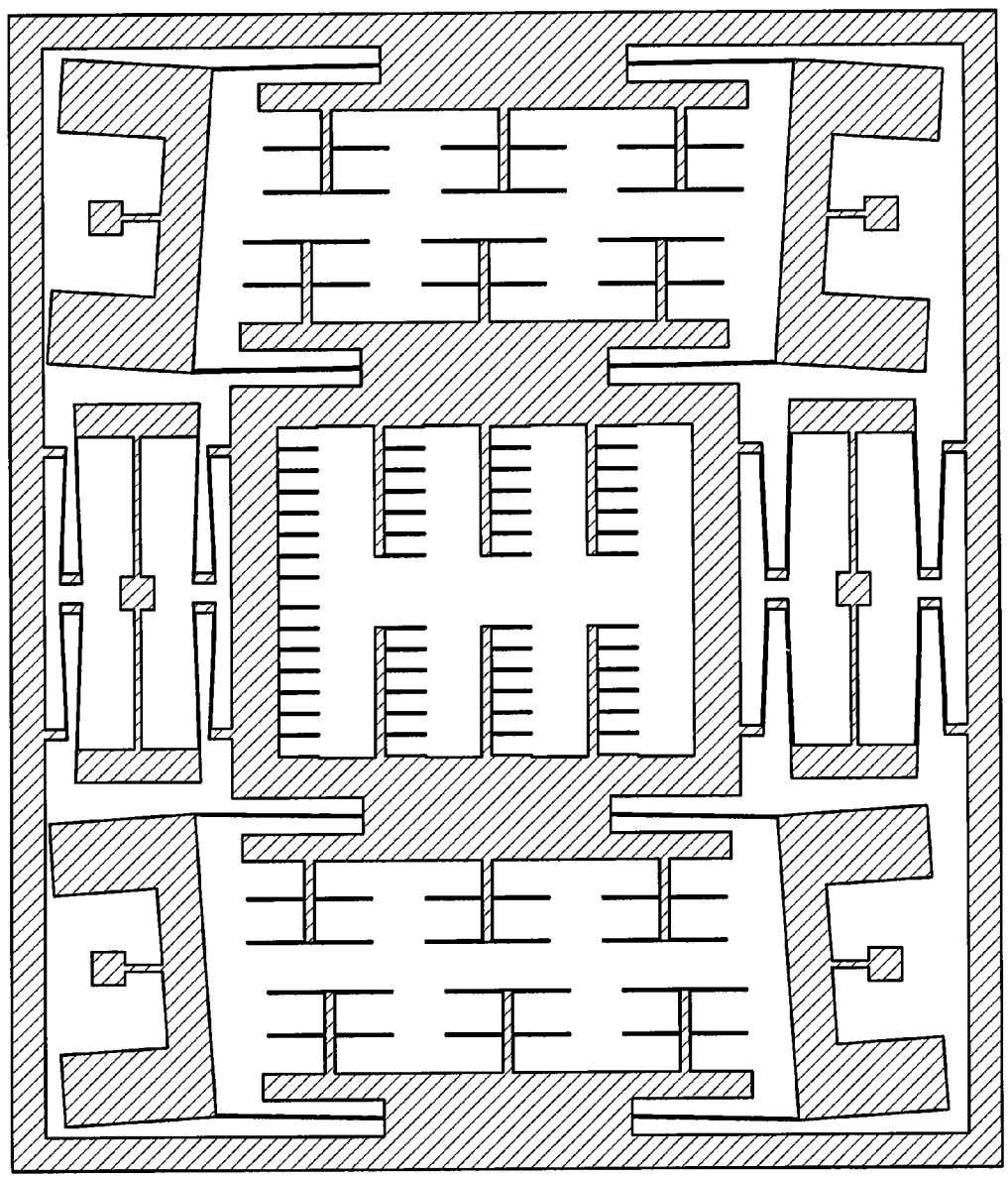
FIG. 5 shows exemplary embodiment 1, primary mode and drive mode without read units and read devices.
Figure 5:
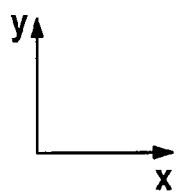
Figure 6:
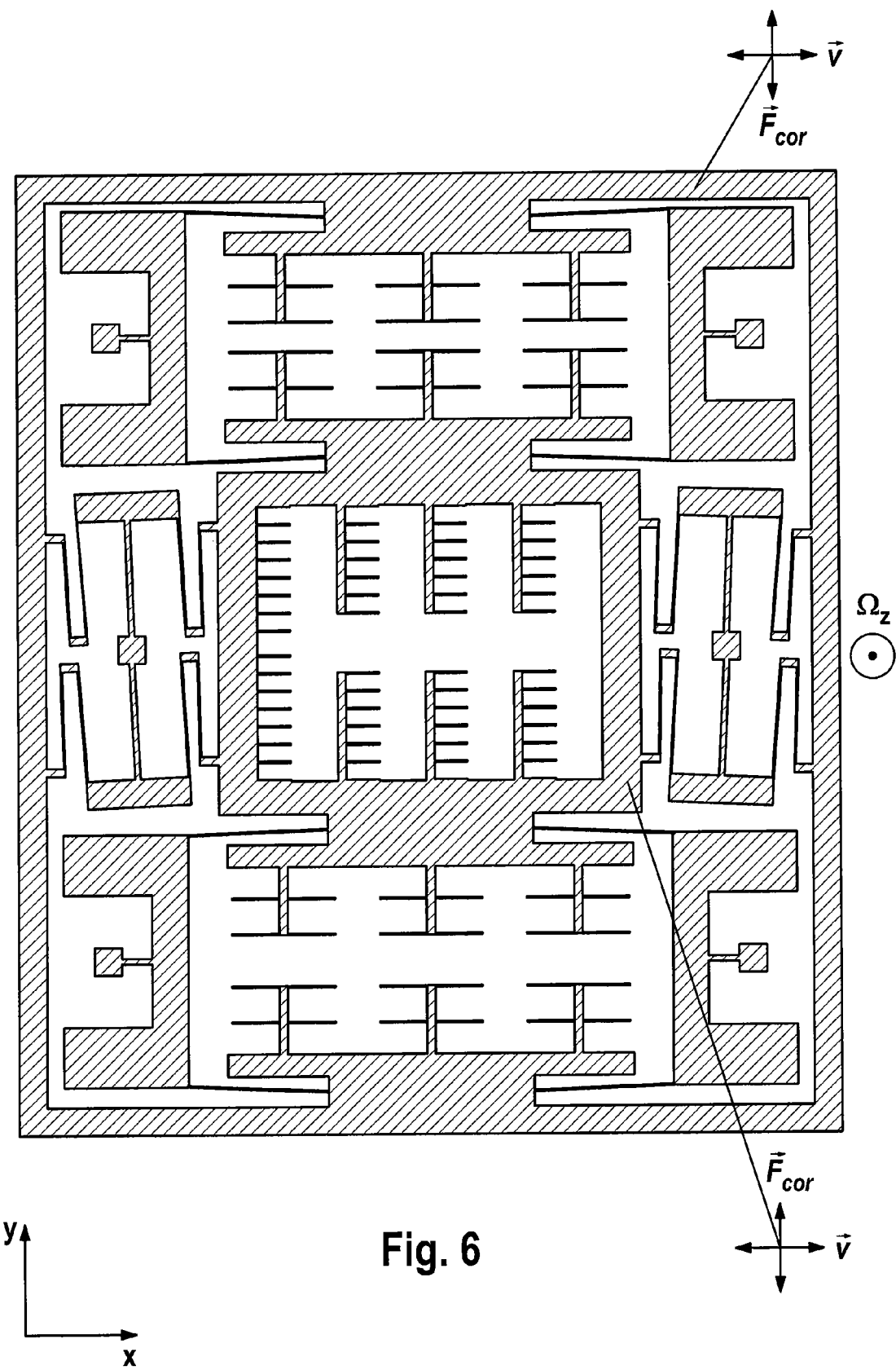
FIG. 6 shows exemplary embodiment 1—secondary mode or first read mode.
Figure 7:
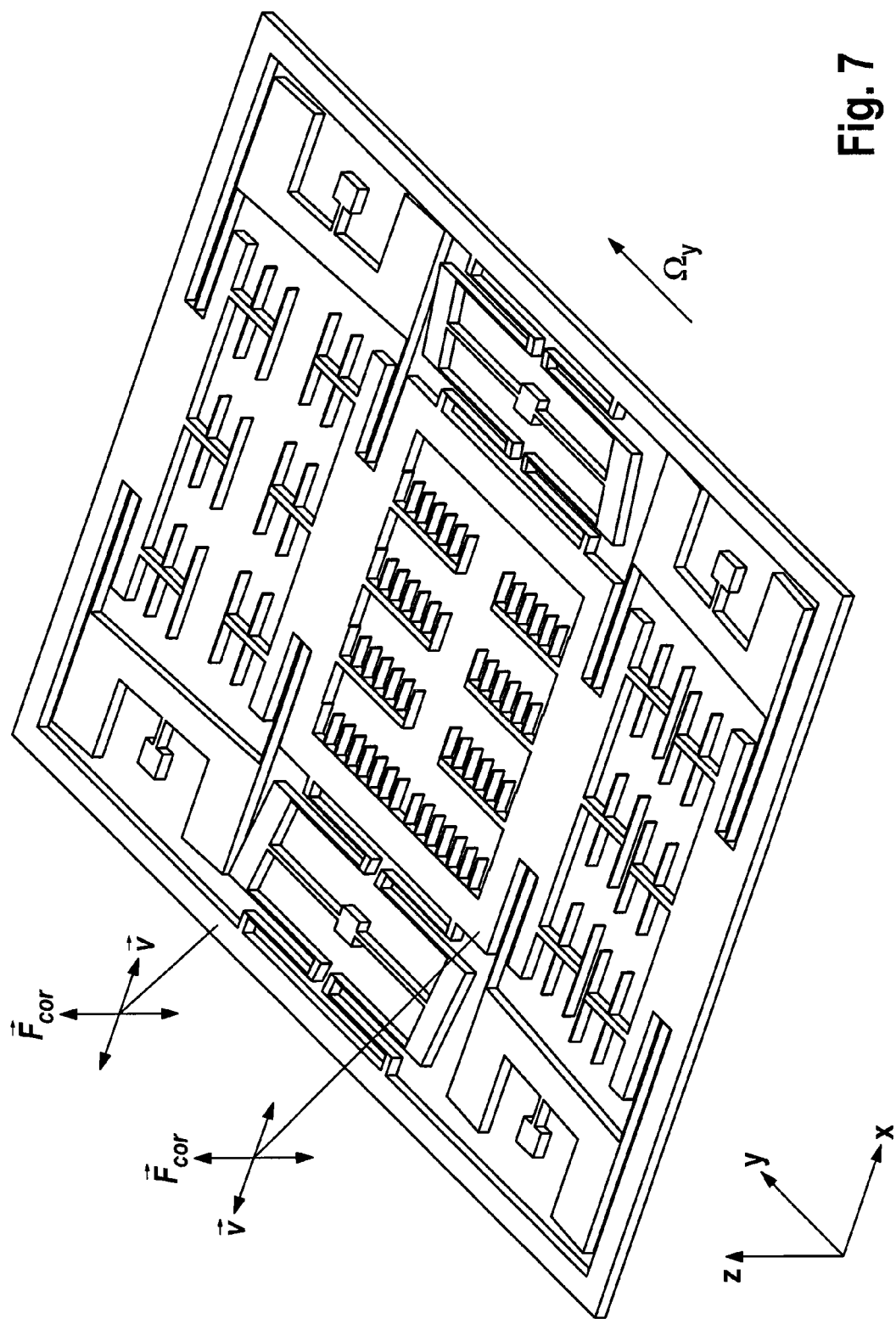
FIG. 7 shows exemplary embodiment 1—tertiary mode or second read mode.

Therefore, the spring-and-beam elements 3, 4, 5, 7 allow only antiphase linear movement of the two masses 1 and 2 in the y and z directions, while the spring-and-beam elements 8, 9, 10, 12 allow only antiphase linear movement of the two masses 1 and 2 in the x and z directions. In consequence, the following natural modes of the masses 1 and 2 are mainly possible:

Antiphase linear movement in the x direction primary mode, FIG. 4, FIG. 5,

Antiphase linear movement in the z direction secondary mode, FIG. 6,

Antiphase linear movement in the y direction tertiary mode, FIG. 7.

Functional Principle, Primary Mode:

In order to measure rotation speeds, the sensor must first of all be operated in the primary mode, FIG. 5. This is characterized by the seismic masses 1 and 2 oscillating linearly in the x direction, in antiphase to one another; in this case, the spring-and-beam elements 8, 9, 10, 12 and the mass symmetry between the seismic masses 1 and 2 guarantee that the amplitudes of the two masses have the same magnitude. The center of gravity of the entire arrangement remains at rest during the primary movement. By way of example, the primary mode can be driven by electrostatic excitation with the aid of capacitive comb structures.

Secondary and Tertiary Modes:

If the sensor is rotated about the z axis, Coriolis forces act on the moving masses. In this case, Coriolis forces with identical amplitudes but different phase angles act on the seismic masses 1 and 2. The phase relationships are derived from the phase angle of the speed of the seismic masses 1 and 2 during the primary movement; the Coriolis forces therefore excite the secondary mode, see FIG. 6. On the basis of a rotation $\overline{\Omega}$ of a mass point m with respect to an inertial system which is moving at a velocity $\overline{v}$ with respect to the moving coordinate system, the Coriolis force is: $\overline{F}_{cor}=2m\overline{v}\times\overline{\Omega}$. If the sensor is rotated about the y axis, apparent forces act on the moving masses. In this case, Coriolis forces act on the seismic masses 1 and 2 such that the tertiary mode is excited, see FIG. 7.

The deflections of the secondary and tertiary oscillations in the case of a Coriolis force are proportional, inter alia, to the respective rotation speed, $\Omega_z$ and $\Omega_y$ that produces them. By way of example, the deflections can be detected by capacitive elements, which convert the mechanical deflection into a capacitive signal.

Read Structures and Read Devices, Secondary Detection:

The elements 16 and 17 detect deflections of the masses 1 and 2 in the y direction. The detection units are in the form of capacitive comb structures—characterized by the overlap area and the distance between the moving structure and the opposing electrode, which is connected to the substrate. When the moving structure is deflected in the y direction, the distance between the plates, and therefore the capacitance, changes. A detection element 16 or 17 contains the same number of identical capacitive structures for each seismic mass 1 and 2, and they are arranged such that a capacitance signal proportional to the deflection is produced when the masses 1 and 2 are deflected in antiphase. The respective detection element 16 or 17 is insensitive to in-phase deflection of the masses 1 and 2. The difference between the capacitive signals 16 and 17 is then used as a measure for the strength of the Coriolis force. This type of subtraction process eliminates parasitic signals which are present at the same phase in both detection paths, for example signals which are caused by electrical crosstalk on both paths. This type of reading detects only the secondary mode and is insensitive to other natural modes, in which the masses 1 and 2 move in the same phase in the direction of the y axis. Different arrangements of the comb structures and adapted signal evaluation are also possible.

Tertiary Detection

The elements or read devices 18 and 19 detect deflections of the masses 1 and 2 in the z direction, and are connected such that the difference between the capacitive changes of the elements 18 and 19 is used as an output signal. This type of reading detects only the tertiary mode and is insensitive to in-phase movements of the masses 1 and 2 in the z direction.

Alternative Tertiary Detection

The spring-and-beam arrangement 8, 9, 10, 12 may have a rectangular coupling beam analogous to the spring-and-beam structure 3, 4, 5, 7. In the situation illustrated, the coupling beam is, however, C-shaped, such that there is space for read electrodes or read devices on the surfaces which are additionally present. The read devices 20 and 21 detect deflections of the coupling beams 10 in the z direction, which result during the tertiary mode when the coupling beams 10 are rotated about the x axis. They are connected such that the difference between the capacitance changes of the elements 20 and 21 is used as an output signal. This type of reading detects only the tertiary mode, and is insensitive to in-phase movements of the masses 1 and 2 in the z direction. The adjacent position of the read electrodes reduces external disturbance influences on the electrodes themselves, since any disturbance influences act to the same extent on both electrodes, and are eliminated by the differential principle. Furthermore, the rigid coupling of the electrode geometries 20 and 21 by means of the coupling beam leads to optimum coupling of the capacitance signals.

Figure 8:
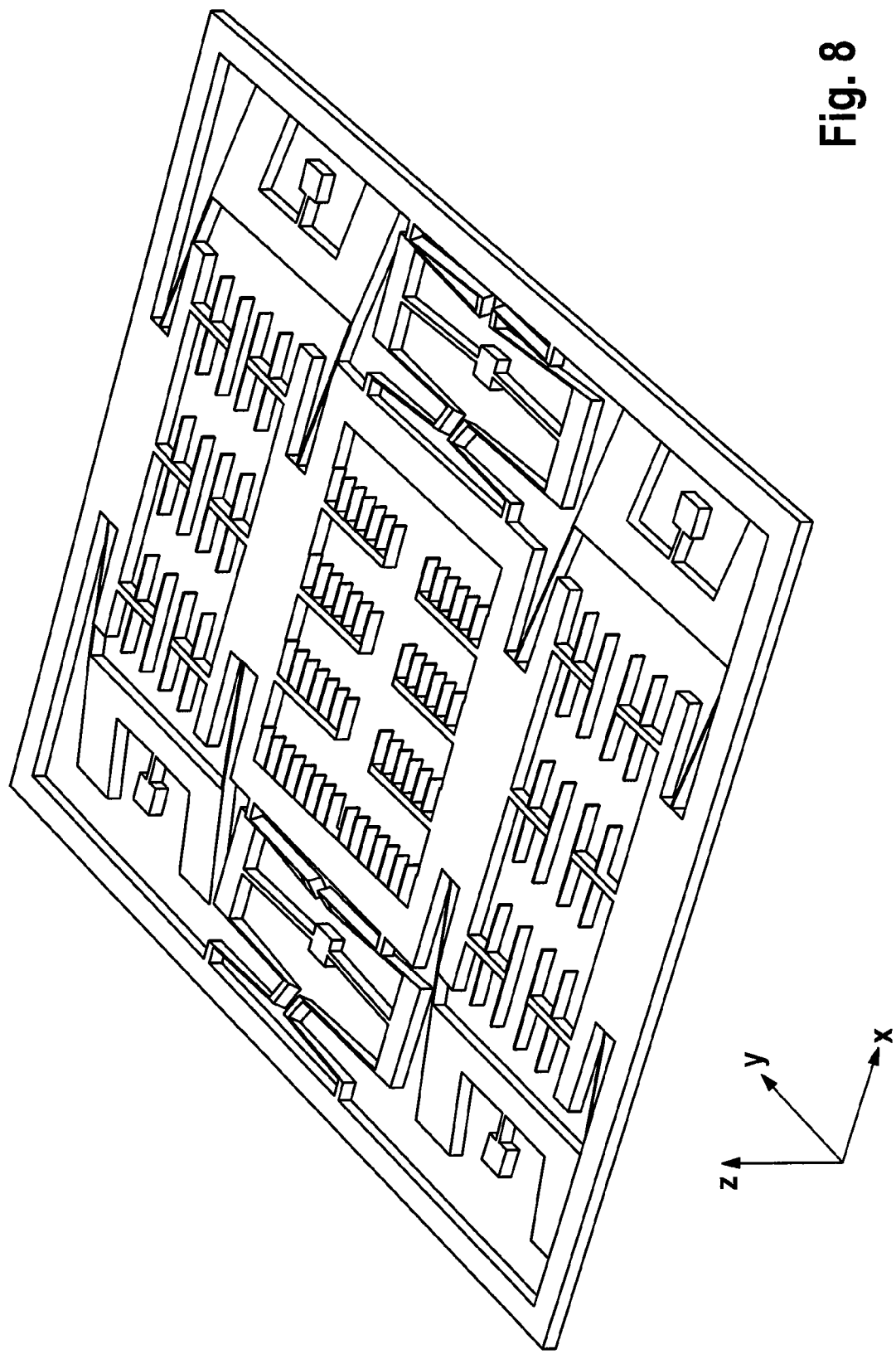
FIG. 8 shows exemplary embodiment 1—in-phase tertiary mode as a parasitic, undesired mode.
Figure 9:
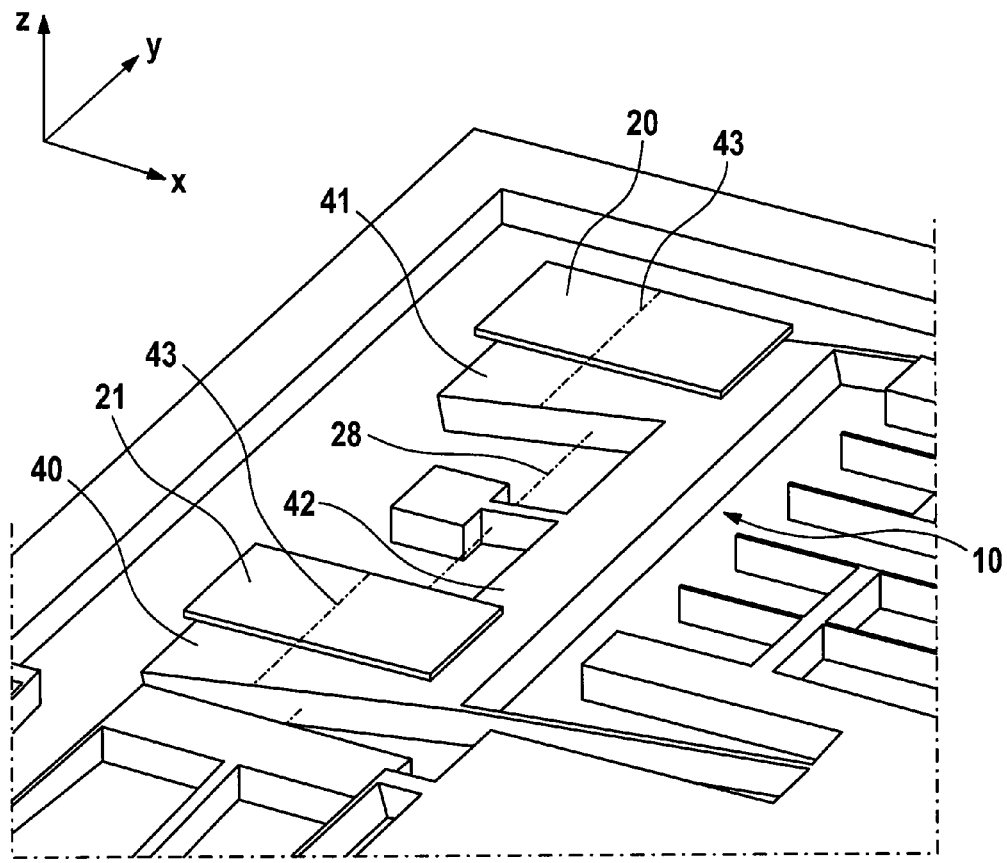
FIG. 9 shows exemplary embodiment 1—in-phase, parasitic rotational deflections of the two edge segments of the coupling beam about the y axis—insensitive detection electrodes and read devices, which are associated with a c-shaped coupling beam of the first coupling device.

A further advantage of the detection electrodes 20 and 21 combined with the C-shaped coupling beam 10 is that this read structure is insensitive to the in-phase tertiary mode, FIG. 8. The in-phase tertiary mode is shifted, as already mentioned, by the chosen spring arrangement toward high frequencies. If the spring elements 8 and 9 are deflected in phase in the z direction, a torque acts on the coupling beam 10 about the y axis, as a result of which the coupling beam rotates about the y axis. Given suitable dimensions of the spring-and-beam arrangement 8, 9, 10, 12 and of the electrodes 20 and 21, the coupling beam in this case rotates approximately about an axis parallel to the y axis 28 such that no capacitance signal is produced by the rotation. The x coordinate of the rotation axis is in this case defined by the centroid of the area of the electrodes 20 and 21, and the z coordinate is defined by the center of gravity of the moving structure, cf. FIG. 9. By way of example, the coupling beam 10, which is c-shaped, has two edge segments 40, 41 as well as a connection segment 42. The two read devices 20, 21 which are associated with this coupling beam are arranged such that the centers 43 of their longitudinal sides, essentially in the direction of the longitudinal side of the two edge segments 40, 41, are each arranged with respect to the x-y alignment opposite the center 43 of the longitudinal side of one of the edge segments, such that possible in-phase rotational deflections of the two edge segments about the y axis, which result from these two edge segments then being in an inclined position, are essentially not detected by the two read devices, with these two read devices in particular being arranged parallel to the two edge segments in a rest state, in each case with respect to the base surfaces.

Further Actuators and Detectors

Further electromechanical structures are required for operation of the sensor. In this case, drive means or a drive device 14 are or is required for operation. These or this may act directly on the mass 1, on the mass 2 or on both masses. Drive monitoring structures 15 are generally used for monitoring the primary oscillation and can act on the mass 1, on the mass 2 or on both masses in the same way as the drive means 14. At least two drive monitoring structures can be arranged such that the difference between the individual capacitances is a measure of the deflection during the primary movement, as a result of which in-phase movement of the seismic masses in the x direction remains undetected.

Figure 10:
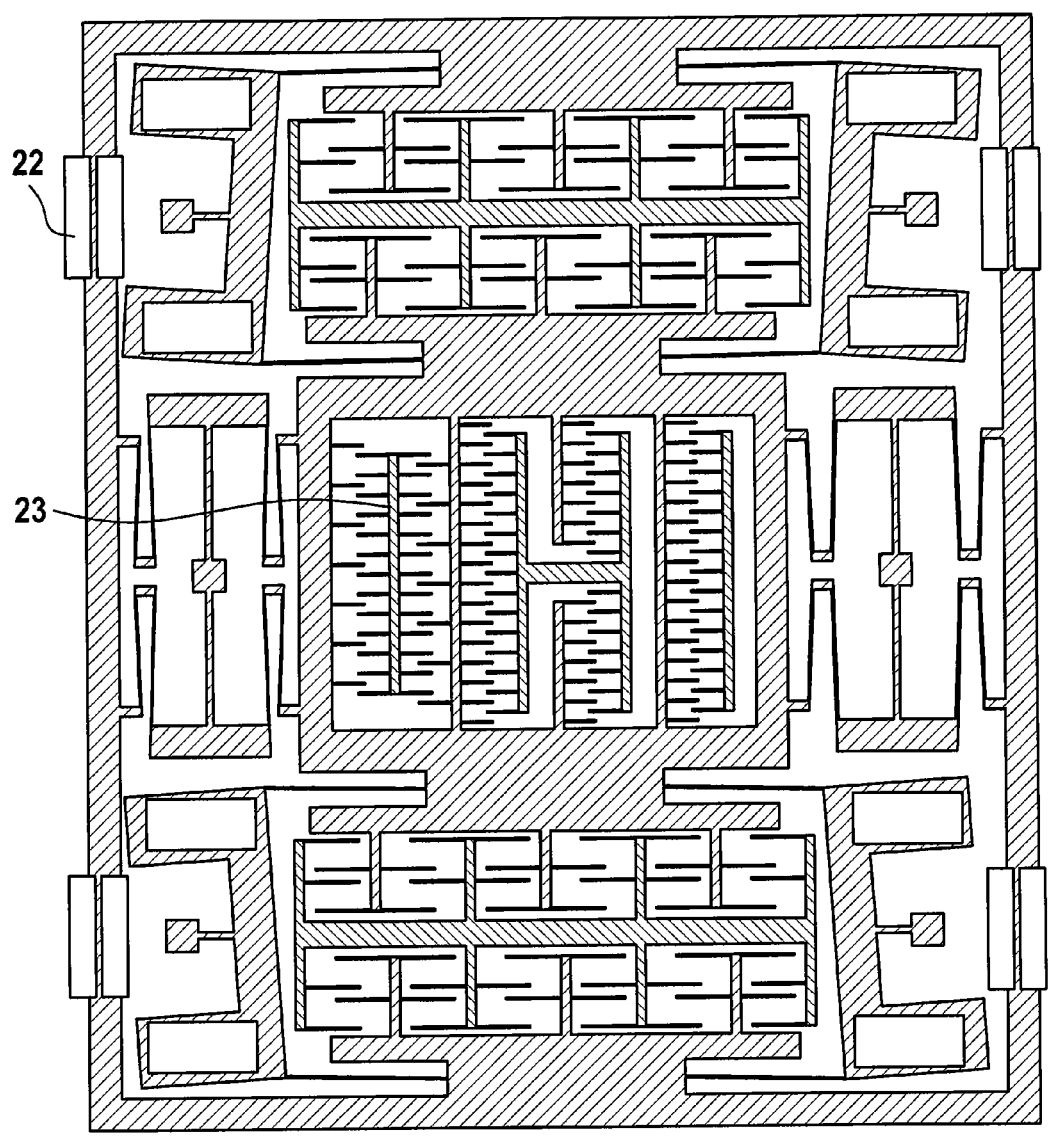
FIG. 10 shows exemplary embodiment 1 with a drive, drive monitoring and trim structures.

Further means can be attached to the sensor in order to suppress parasitic signals ("quadrature") and/or to influence the frequency and/or in order to reset oscillations on the basis of the rotation rate ("force feedback"). By way of example, FIG. 10 illustrates structures such as these for the secondary oscillator 23 and the tertiary oscillator 22.

Figure 11:
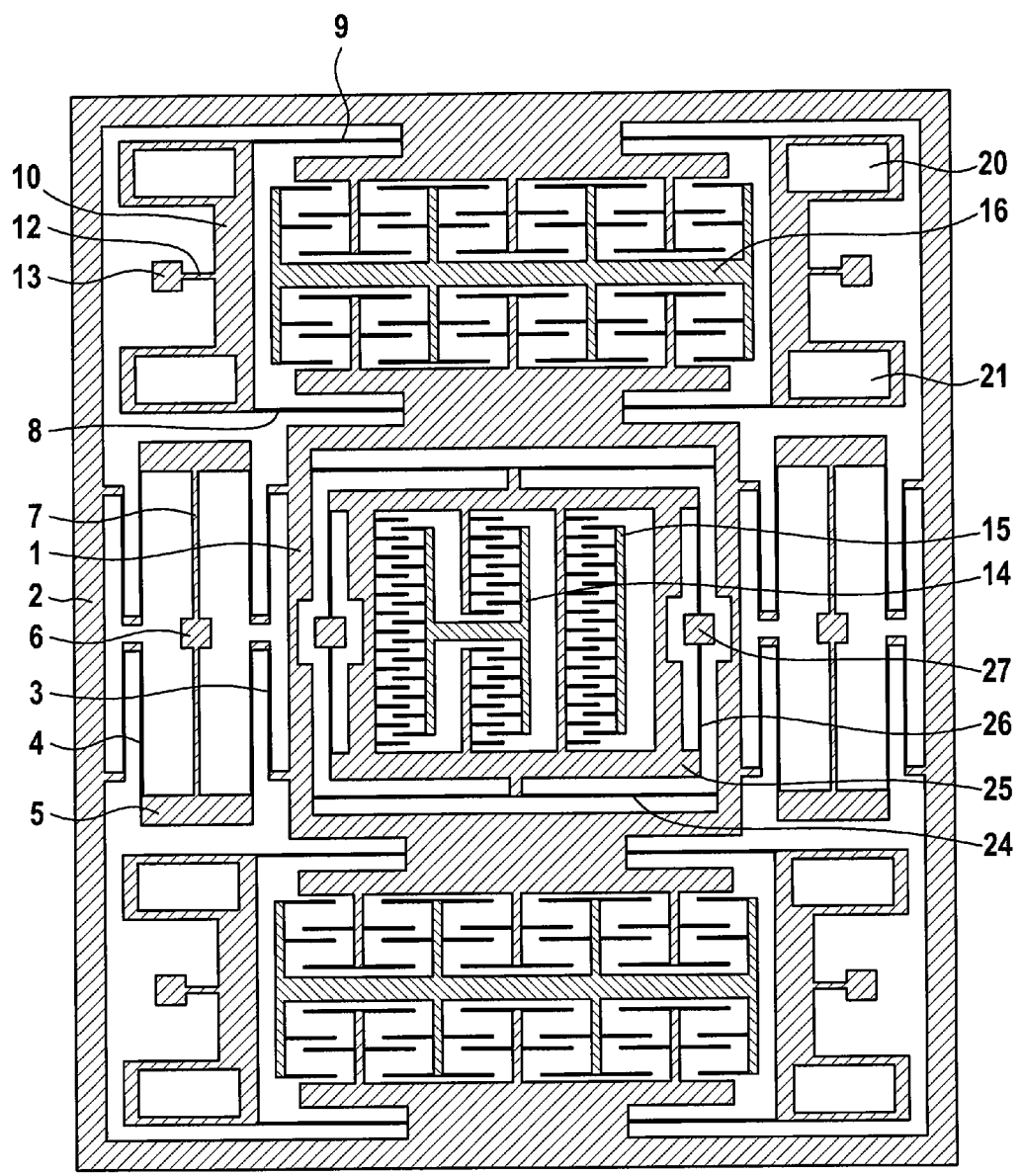
FIG. 11 shows a plan view of a dual-axial rotation rate sensor—exemplary embodiment 2.
Figure 12:
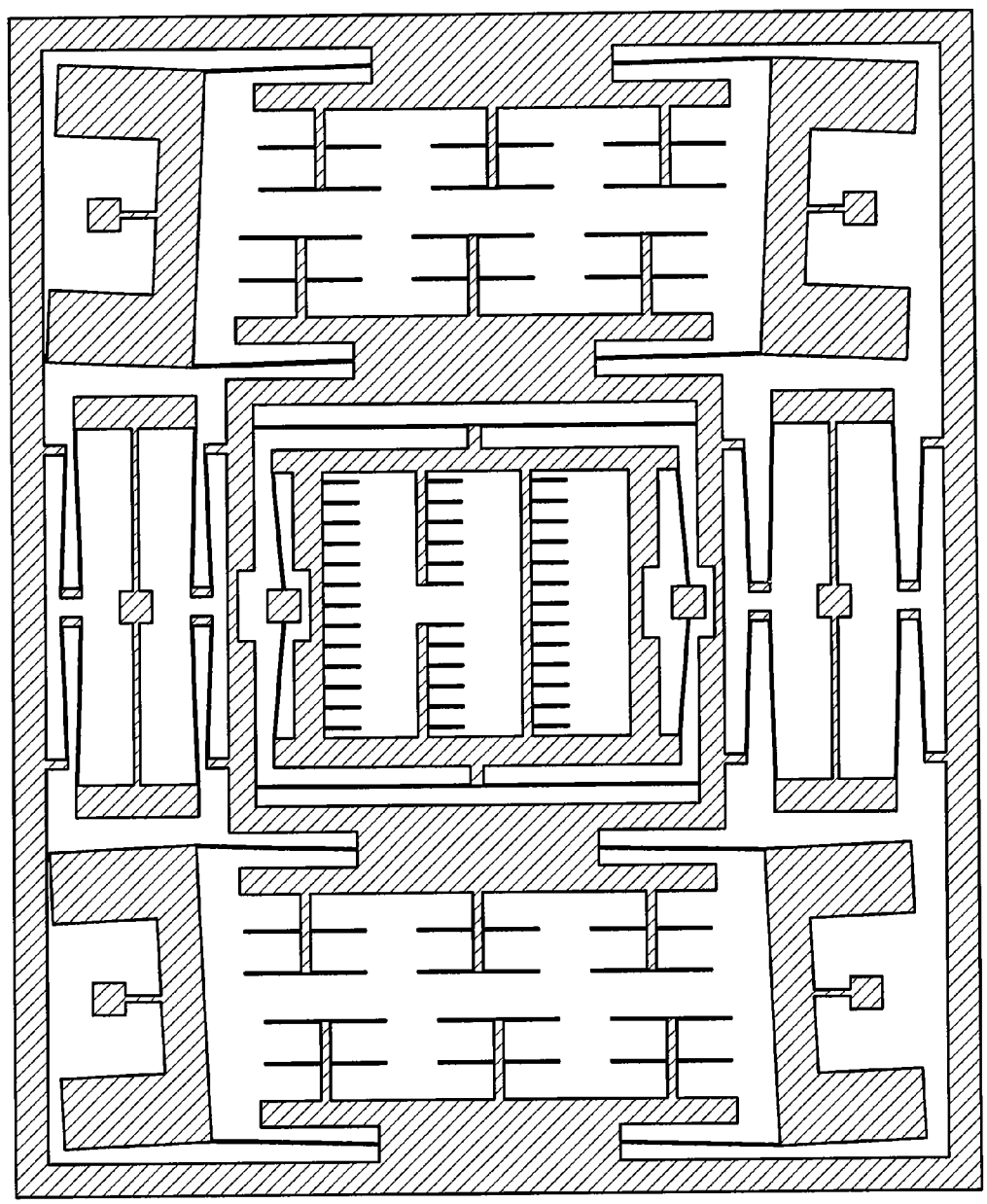
FIG. 12 shows exemplary embodiment 2, primary mode and drive mode.
Figure 13:
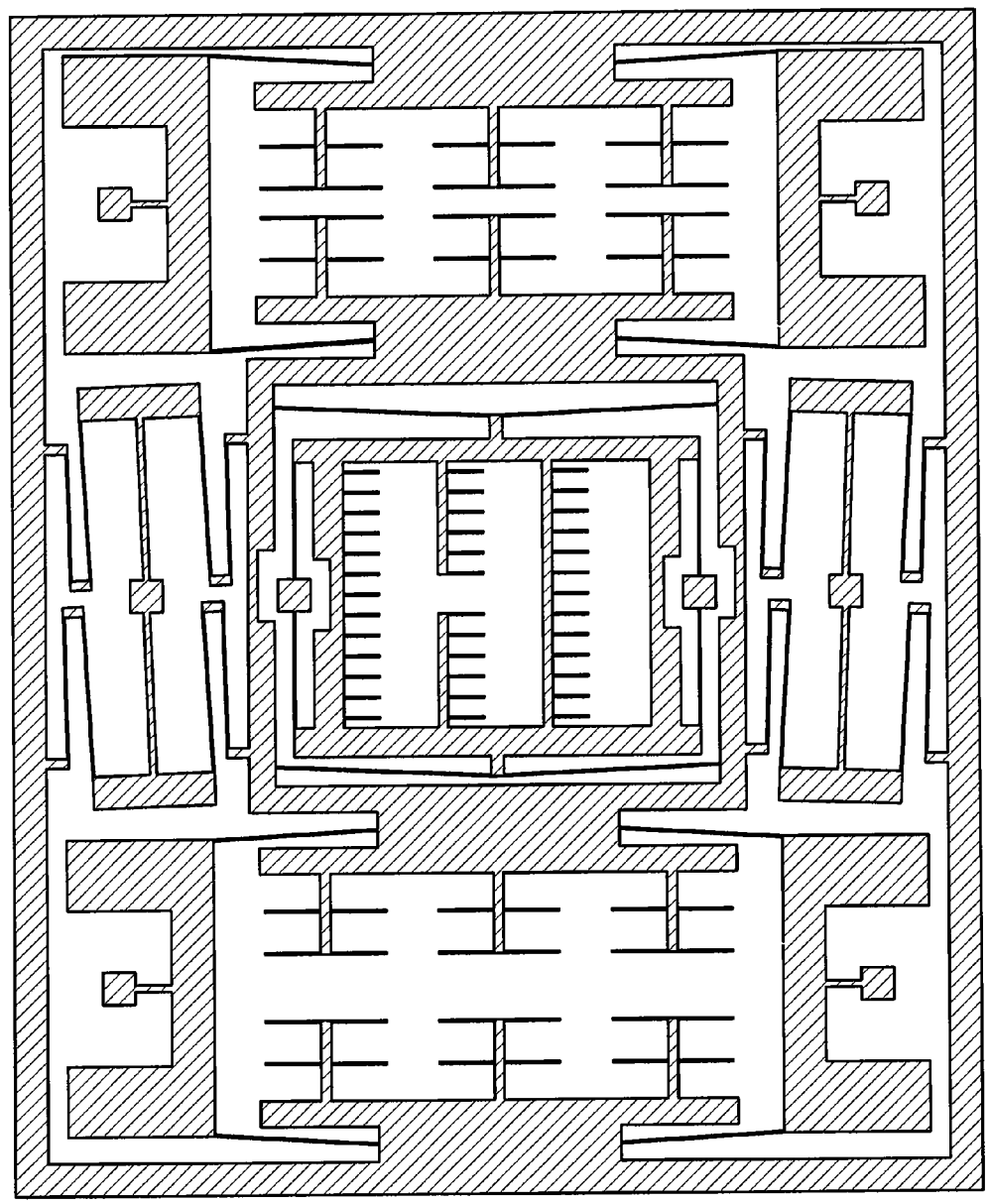
FIG. 13 shows exemplary embodiment 2—secondary mode or first read mode.
Figure 13:
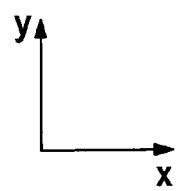
Figure 14:
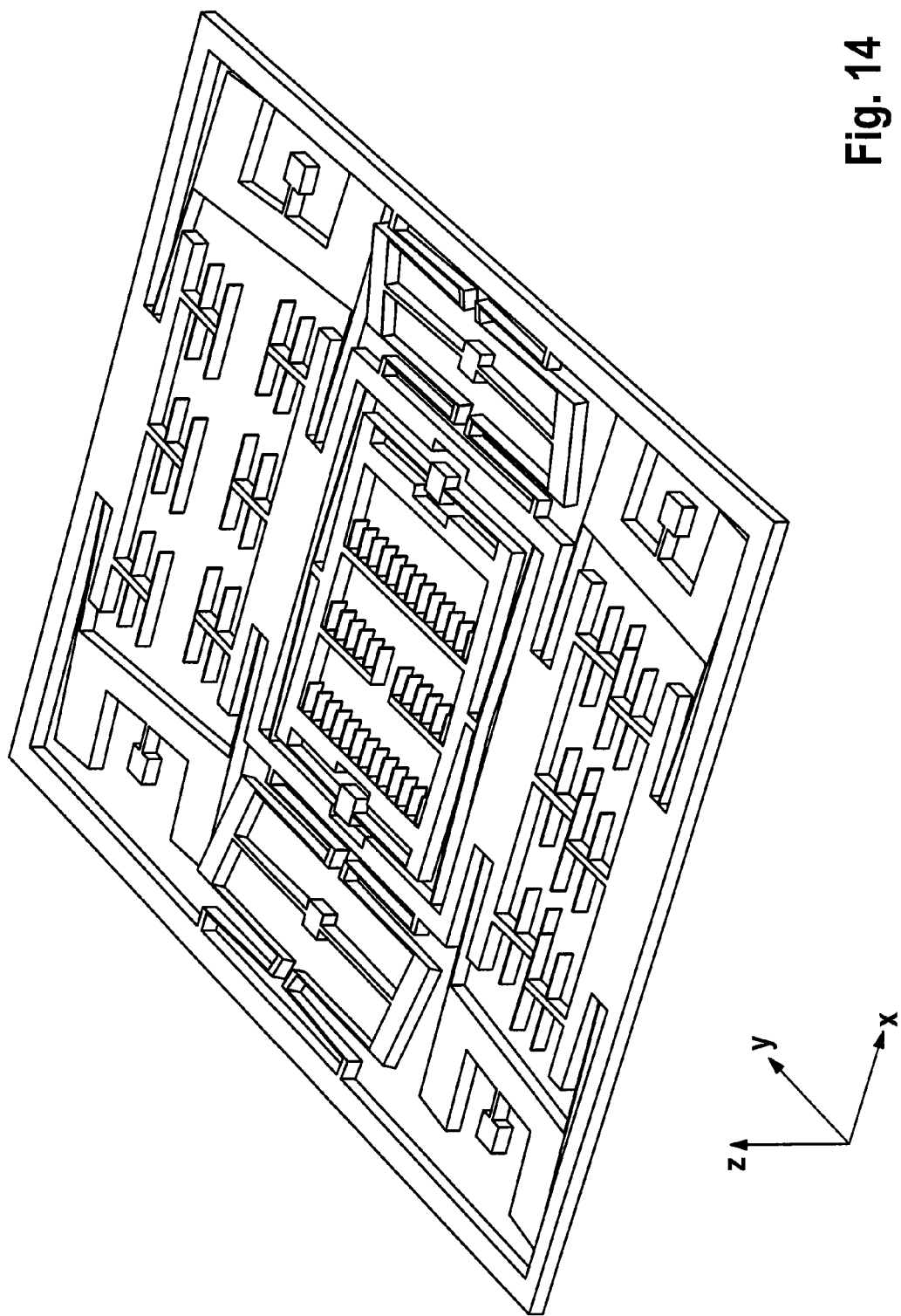
FIG. 14 shows exemplary embodiment 2—tertiary mode or second read mode.

Exemplary Embodiments 2+3, Design:

FIG. 11 shows the rotation rate sensor described in accordance with exemplary embodiment 1, with the drive unit being decoupled. A frame is linked to the inner seismic mass 1 via spring elements 24, to which frame the moving parts of the drive and drive monitoring structures are rigidly attached. In this case, the spring elements 24 have a high spring stiffness in the drive direction, the x axis, but are as soft as possible in the y and z directions. Furthermore, the drive unit is attached to the substrate anchors 27 via spring elements 26, with the spring elements 26 allowing movement in the drive direction but being as stiff as possible in the y and z directions. This leads to the decoupled drive unit being able to complete the primary movement with the same amplitude as the inner seismic mass 1, FIG. 12. However, the drive frame remains at rest in the secondary and tertiary modes, cf. FIG. 13 and FIG. 14.

Figure 15:
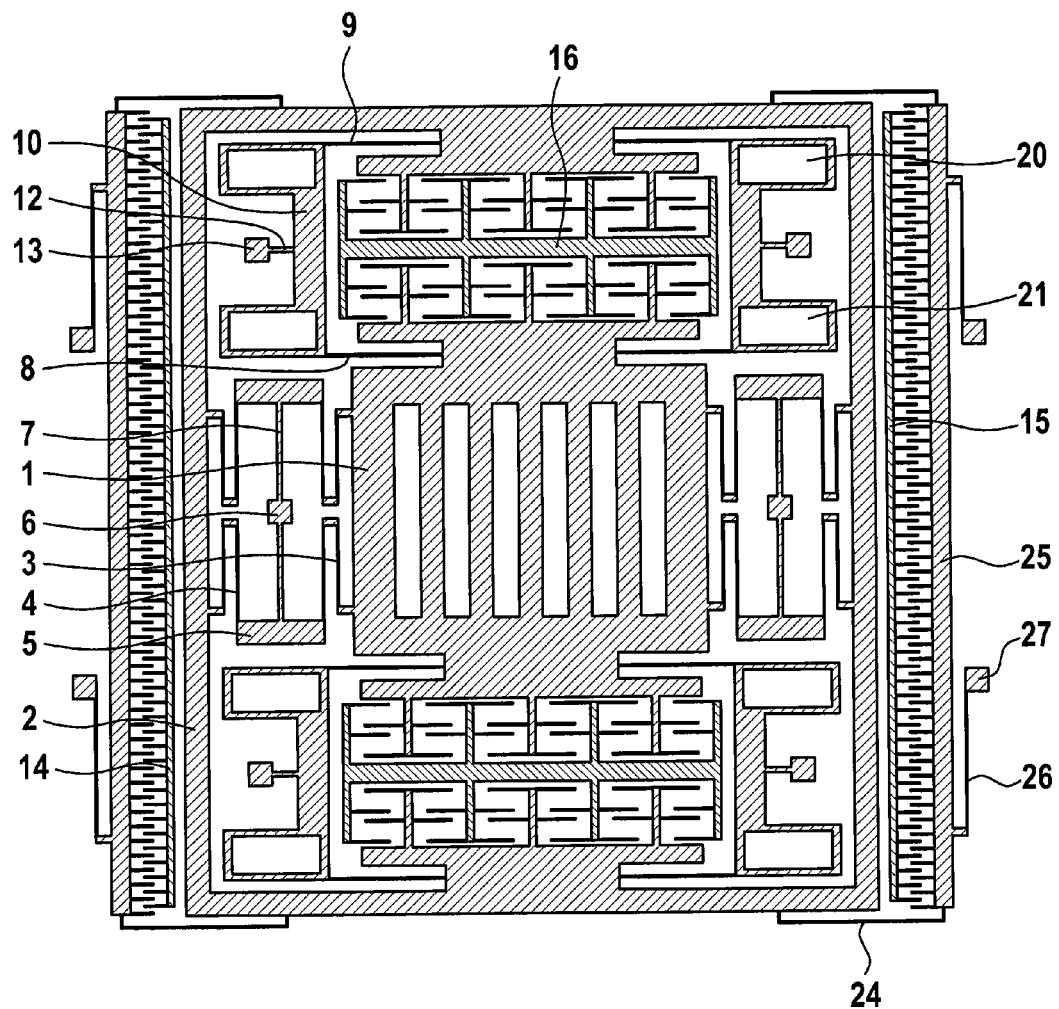
FIG. 15 shows a plan view of a dual-axial rotation rate sensor—exemplary embodiment 3.
Figure 16:
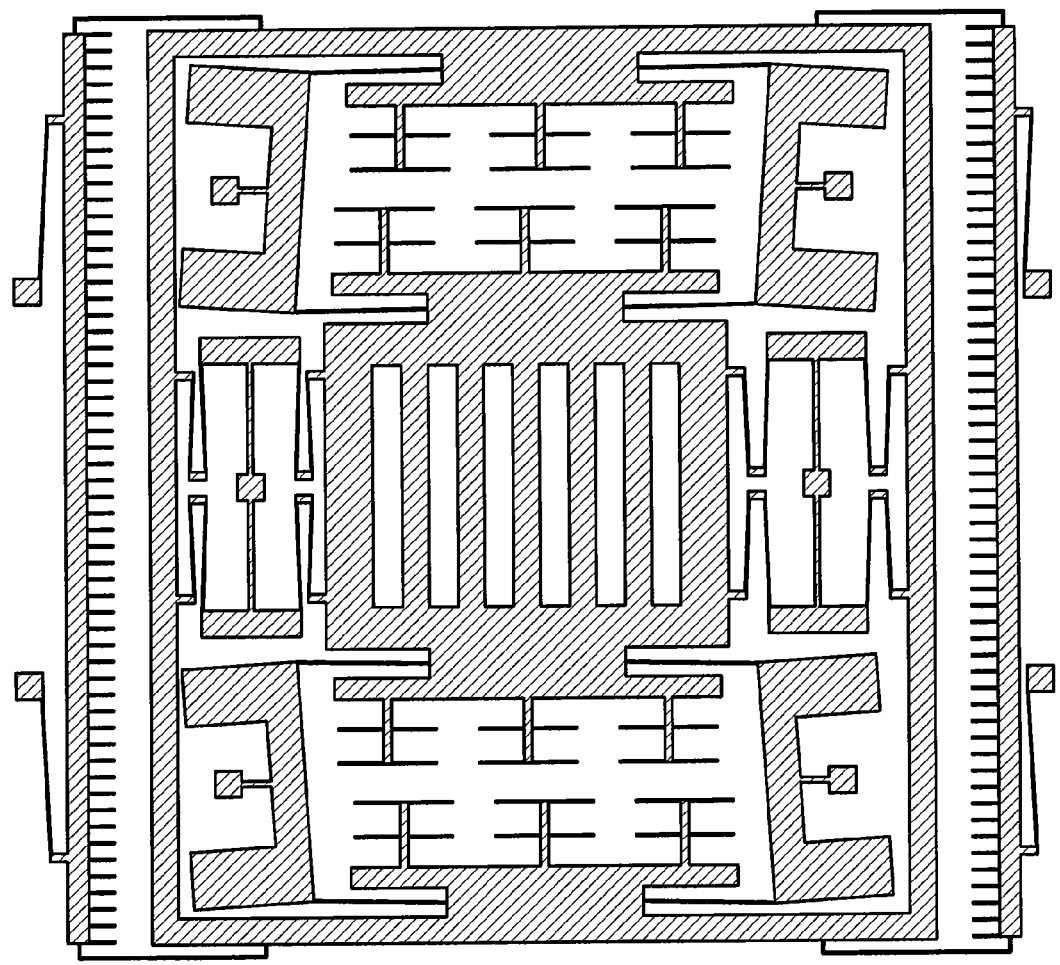
FIG. 16 shows exemplary embodiment 3—primary mode or drive mode.
Figure 16:
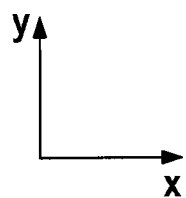
Figure 17:
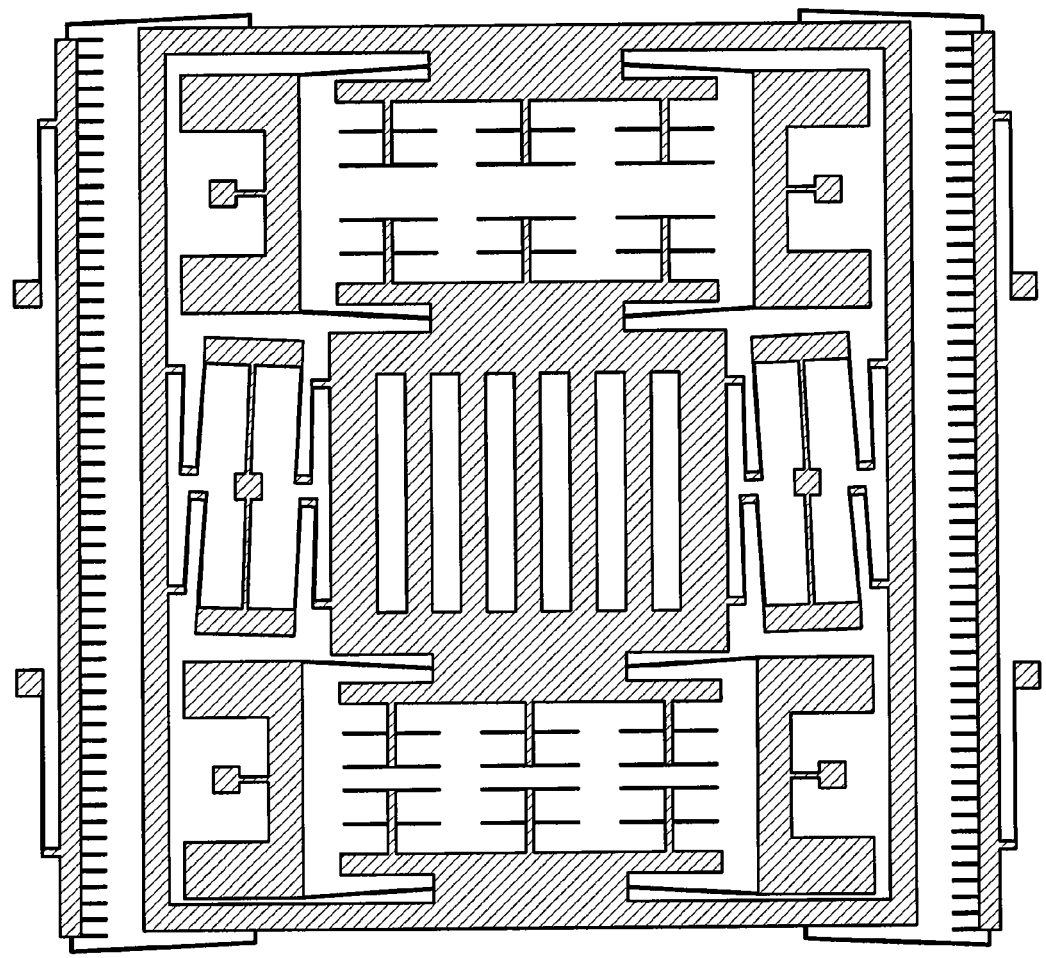
FIG. 17 shows exemplary embodiment 3—second mode or first read mode.
Figure 17:
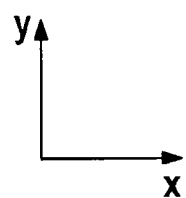
Figure 18:
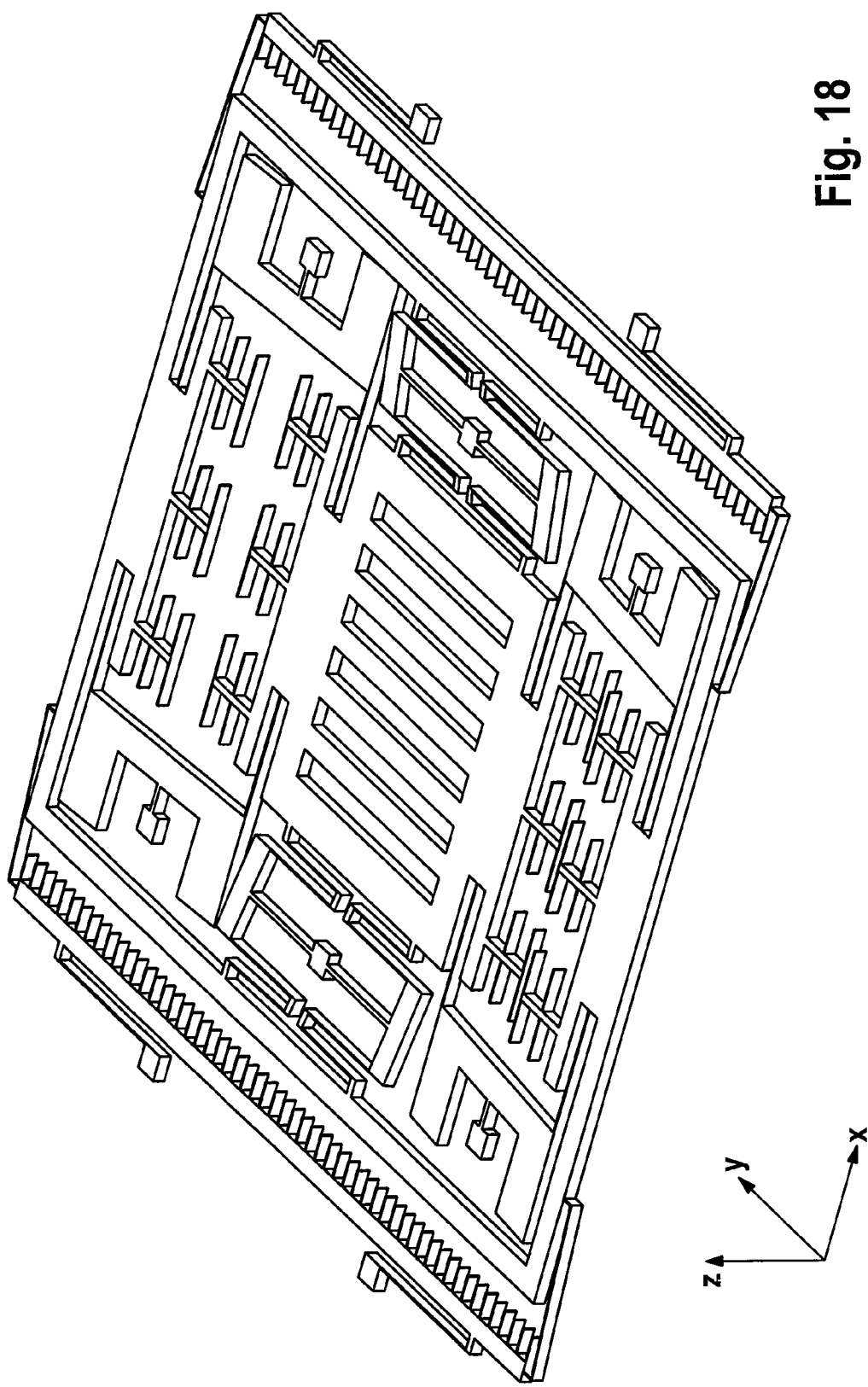
FIG. 18 shows exemplary embodiment 3—tertiary mode or second read mode.

FIG. 15 shows the rotation rate sensor described in accordance with exemplary embodiment 1, with the drive unit being decoupled. Frames are linked to the outer seismic mass 2 via spring elements 24, to which frames the moving parts of the drive or drive monitoring structures are rigidly attached. In this case, the spring elements 24 have a high spring stiffness in the drive direction, the x axis, but are as soft as possible in the y and z directions. Furthermore, the drive and drive monitoring unit is attached via spring elements 26 and substrate anchors 27, with the spring elements 26 allowing movements in the drive direction, but being as stiff as possible in the y and z directions. This leads to the decoupled drive unit being able to carry out the primary movement with the same amplitude as the outer mass 2, FIG. 16. However, the drive frame remains at rest in the secondary and tertiary modes, cf. FIG. 17 and FIG. 18. This type of decoupling has the particular advantage that disturbance forces which are produced by asymmetries in the drive (monitoring) structures cannot be transmitted directly to the read modes.

The invention claimed is:

1. A micromechanical rotation rate sensor, comprising a substrate whose base surface is aligned parallel to a plane comprising an x-axis and a y-axis, with the rotation rate sensor having at least one first seismic mass and a second seismic mass which are coupled to at least one first drive device and are suspended such that the first and the second seismic masses are driven such that they are deflected in antiphase in one drive mode, with the rotation rate sensor configured to detect rotation rates about at least two mutually essentially orthogonal sensitive axes, wherein at least the second seismic mass is in the form of a frame which at least partially surrounds the first seismic mass with respect to the position on the plane, wherein the first and second seismic masses are coupled to one another by at least one first and one second coupling device that comprises at least one essentially rigid coupling beam and at least one torsion spring for allowing rotational deflection about one or two axes and for suppressing further rotational deflections and all translational deflections of the least one essentially rigid coupling beam coupling beam.

2. The rotation rate sensor as claimed in claim 1, wherein, when a first rotation rate is detected about the first sensitive axis, they oscillate in antiphase in a first read mode, and when a second rotation rate is detected about the second sensitive axis, they likewise oscillate in antiphase in a second read mode.

3. The rotation rate sensor as claimed in claim 2, wherein the rotation rate sensor has a single drive device, which drives the first and the second seismic masses of the rotation rate sensor in antiphase.

4. The rotation rate sensor as claimed in claim 2, wherein the first and second seismic masses of the rotation rate sensor are suspended and coupled by at least the first and second coupling devices and are configured to move exclusively along their respective deflections within the drive mode, for their respective deflections within the first read mode and for their respective deflections within the second read mode, and the first and second seismic masses are suspended stiffly with respect to all other deflections and all in-phase deflections of the first and second seismic masses are suppressed.

5. The rotation rate sensor as claimed in claim 2, wherein the at least one essentially rigid coupling beam is coupled by spring elements on one side to the first seismic mass and on an other side to the second seismic mass.

6. The rotation rate sensor as claimed in claim 5, wherein the first coupling device is configured to force antiphase deflections of the seismic masses with respect to the drive mode and suppresses in-phase deflections with respect thereto, and the first and the second coupling devices are configured to force antiphase deflections of the seismic masses with respect to the first read mode and with respect to the second read mode, and suppress in-phase deflections with respect thereto, suppressing all in-phase deflections of the first and second seismic masses.

7. The rotation rate sensor as claimed in claim 5, wherein at least one coupling beam of at least one of the coupling devices is associated with two or more read devices which are configured to detect the rotational deflection of this coupling beam with respect to the first or second read mode in phase and in antiphase, one of the read modes being in phase and the other read mode being in antiphase.

8. The rotation rate sensor as claimed in claim 7, wherein the coupling beam is essentially c-shaped, with a base surface essentially parallel to the x-y plane in a rest state, with at least two edge segments and one connection segment, with the connection segment being connected essentially centrally to the torsion spring element such that the two edge segments can be deflected rotationally in antiphase, with this torsion spring element not being stiff at least with respect to a parasitic rotational deflection about the y axis, wherein the centers of longitudinal sides of the two read devices, essentially in the direction of the longitudinal side of the two edge segments, are each arranged with respect to the x-y alignment opposite the center of the longitudinal side of one of the edge segments, such that possible in-phase rotational deflections of the two edge segments about the y axis, which result from these two edge segments then being in an inclined position, are essentially not detected by the two read devices, with these two read devices being arranged parallel to the two edge segments in a rest state, in each case with respect to the base surfaces.

9. The rotation rate sensor as claimed in claim 1, wherein the first and the second seismic masses have essentially the same mass and wherein the center of gravity of the entire rotation rate sensor remains essentially at rest with respect to the deflections of the seismic masses in the drive mode.

10. The rotation rate sensor as claimed in claim 1, wherein the rotation rate sensor comprises a first sensitive axis that lies on the plane, the first sensitive axis is parallel to the x axis or to the y axis, and the second sensitive axis is parallel to z axis, the z axis being at a right angle to the plane.

11. The rotation rate sensor as claimed in claim 1, wherein the at least one drive device is rigidly connected to the first or to the second seismic mass.

12. The rotation rate sensor as claimed in claim 1, wherein the at least one drive device is coupled to the first or to the second seismic mass by at least one spring element, such that translational coupling is provided in the drive direction between the drive unit and the first or second seismic mass, and translational decoupling is provided in all other directions.

13. The rotation rate sensor as claimed in claim 12, wherein the drive device is in this case additionally suspended on the substrate by at least one further spring element, with this suspension configured to be stiff on the x-y plane and at right angles to the drive direction, such that deflections of the drive device on the x-y plane in a direction other than the output-drive direction are suppressed.

14. The use of a rotation rate sensor as claimed in claim 1 in motor vehicles, for detection of the yaw rate and for detection of a roll rate or a pitch rate of the vehicle.

15. A micromechanical rotation rate sensor, comprising:
a substrate whose base surface is aligned parallel to a plane comprising an x-axis and a y-axis, with the rotation rate sensor having at least one first seismic mass and a second seismic mass which are coupled to at least one first drive device and are suspended such that the first and the second seismic masses are driven such that they are deflected in antiphase in one drive mode, with the rotation rate sensor configured to detect rotation rates about at least two mutually essentially orthogonal sensitive axes,
wherein at least the second seismic mass is in the form of a frame which at least partially surrounds the first seismic mass with respect to the position on the plane, and
wherein the deflection of the first and second seismic masses in each of at least two read modes are detected, with the deflection of one of the two seismic masses in each case being detected in opposite phases by two read devices with respect to the antiphase deflection, wherein one seismic mass is in phase and to the other seismic mass is in antiphase, and at least two read devices for detecting a capacitance increase when the other read device detects a capacitance decrease.

* * * * *